(12) United States Patent
Lin et al.

(10) Patent No.: US 9,414,016 B2
(45) Date of Patent: Aug. 9, 2016

(54) SYSTEM AND METHODS FOR PERSONA IDENTIFICATION USING COMBINED PROBABILITY MAPS

(71) Applicant: Personify, Inc., Chicago, IL (US)

(72) Inventors: Dennis Lin, Chicago, IL (US); Glenn Francisco, Chicago, IL (US); Quang Nguyen, Ho Chi Minh (VN); Long Dang, Ho Chi Minh (VN)

(73) Assignee: PERSONIFY, INC., Chicago, IL (US)

( * ) Notice: Subject to any disclaimer, the term of this patent is extended or adjusted under 35 U.S.C. 154(b) by 14 days.

(21) Appl. No.: 14/145,874

(22) Filed: Dec. 31, 2013

(65) Prior Publication Data

US 2015/0187076 A1    Jul. 2, 2015

(51) Int. Cl.
| | |
|---|---|
| *G06K 9/00* | (2006.01) |
| *G06K 9/48* | (2006.01) |
| *H04N 7/15* | (2006.01) |
| *G06T 7/00* | (2006.01) |
| *H04N 7/14* | (2006.01) |
| *G06K 9/62* | (2006.01) |

(52) U.S. Cl.
CPC .............. *H04N 7/15* (2013.01); *G06K 9/00228* (2013.01); *G06K 9/6207* (2013.01); *G06K 9/6289* (2013.01); *G06T 7/0081* (2013.01); *G06T 7/0087* (2013.01); *H04N 7/147* (2013.01); *G06T 2207/10016* (2013.01); *G06T 2207/10024* (2013.01); *G06T 2207/10028* (2013.01); *G06T 2207/20076* (2013.01); *G06T 2207/20144* (2013.01); *G06T 2207/30196* (2013.01)

(58) Field of Classification Search
CPC ... G06K 9/46–9/527; G06K 9/00201–9/00214
See application file for complete search history.

(56) References Cited

U.S. PATENT DOCUMENTS

| | | |
|---|---|---|
| 5,001,558 A | 3/1991 | Burley |
| 5,022,085 A | 6/1991 | Cok |
| 5,117,283 A | 5/1992 | Kroos |
| 5,227,985 A | 7/1993 | DeMenthon |
| 5,343,311 A | 8/1994 | Morag |
| 5,506,946 A | 4/1996 | Bar |
| 5,517,334 A | 5/1996 | Morag |
| 5,534,917 A | 7/1996 | MacDougall |
| 5,581,276 A | 12/1996 | Cipolla |
| 5,631,697 A | 5/1997 | Nishimura |
| 5,687,306 A | 11/1997 | Blank |
| 5,875,040 A | 2/1999 | Matraszek |
| 6,119,147 A | 9/2000 | Toomey |
| 6,150,930 A | 11/2000 | Cooper |

(Continued)

OTHER PUBLICATIONS

Wang, Liang, et al. "Tofcut: Towards robust real-time foreground extraction using a time-of-flight camera." Proc. of 3DPVT. 2010.*

(Continued)

*Primary Examiner* — Stephen R Koziol
*Assistant Examiner* — Sean Conner
(74) *Attorney, Agent, or Firm* — Invention Mine LLC

(57) ABSTRACT

Disclosed herein are systems and methods for extracting person image data comprising: obtaining at least one frame of pixel data and corresponding image depth data; processing the at least one frame of pixel data and the image depth data with a plurality of persona identification modules to generate a corresponding plurality of persona probability maps; combining the plurality of persona probability maps to obtain an aggregate persona probability map; and generating a persona image by extracting pixels from the at least one frame of pixel data based on the aggregate persona probability map.

19 Claims, 5 Drawing Sheets

(56) References Cited

U.S. PATENT DOCUMENTS

| | | |
|---|---|---|
| 6,411,744 B1 | 6/2002 | Edwards |
| 6,618,444 B1 | 9/2003 | Haskell |
| 6,661,918 B1 | 12/2003 | Gordon |
| 6,664,973 B1 | 12/2003 | Iwamoto |
| 6,760,749 B1 | 7/2004 | Dunlap |
| 6,798,407 B1 | 9/2004 | Benman |
| 6,937,744 B1 | 8/2005 | Toyama |
| 7,050,070 B2 | 5/2006 | Ida |
| 7,124,164 B1 | 10/2006 | Chemtob |
| 7,317,830 B1 | 1/2008 | Gordon |
| 7,386,799 B1 | 6/2008 | Clanton |
| 7,420,590 B2 | 9/2008 | Matusik |
| 7,463,296 B2 | 12/2008 | Sun |
| 7,574,043 B2 | 8/2009 | Porikli |
| 7,599,555 B2 | 10/2009 | McGuire |
| 7,602,990 B2 | 10/2009 | Matusik |
| 7,631,151 B2 | 12/2009 | Prahlad |
| 7,633,511 B2 | 12/2009 | Shum |
| 7,634,533 B2 | 12/2009 | Rudolph |
| 7,668,371 B2 | 2/2010 | Dorai |
| 7,676,081 B2 | 3/2010 | Blake |
| 7,692,664 B2 | 4/2010 | Weiss |
| 7,755,016 B2 | 7/2010 | Toda |
| 7,773,136 B2 | 8/2010 | Ohyama |
| 7,821,552 B2 | 10/2010 | Suzuki |
| 7,831,087 B2 | 11/2010 | Harville |
| 8,094,928 B2 | 1/2012 | Graepel |
| 8,146,005 B2 | 3/2012 | Jones |
| 8,175,384 B1* | 5/2012 | Wang .................. G06T 7/0081 348/586 |
| 8,204,316 B2 | 6/2012 | Panahpour |
| 8,225,208 B2 | 7/2012 | Sprang |
| 8,264,544 B1 | 9/2012 | Chang |
| 8,300,890 B1 | 10/2012 | Gaikwad |
| 8,320,666 B2 | 11/2012 | Gong |
| 8,335,379 B2 | 12/2012 | Malik |
| 8,345,082 B2 | 1/2013 | Tysso |
| 8,363,908 B2 | 1/2013 | Steinberg |
| 8,379,101 B2 | 2/2013 | Mathe |
| 8,396,328 B2 | 3/2013 | Sandrew |
| 8,406,494 B2 | 3/2013 | Zhan |
| 8,411,149 B2 | 4/2013 | Maison |
| 8,411,948 B2 | 4/2013 | Rother |
| 8,422,769 B2 | 4/2013 | Rother |
| 8,437,570 B2 | 5/2013 | Criminisi |
| 8,446,459 B2 | 5/2013 | Fang |
| 8,503,720 B2 | 8/2013 | Shotton |
| 8,533,593 B2 | 9/2013 | Grossman |
| 8,533,594 B2 | 9/2013 | Grossman |
| 8,533,595 B2 | 9/2013 | Grossman |
| 8,565,485 B2 | 10/2013 | Craig |
| 8,588,515 B2 | 11/2013 | Bang |
| 8,625,897 B2 | 1/2014 | Criminisi |
| 8,643,701 B2 | 2/2014 | Nguyen |
| 8,649,592 B2 | 2/2014 | Nguyen |
| 8,649,932 B2 | 2/2014 | Mian |
| 8,655,069 B2 | 2/2014 | Rother |
| 8,659,658 B2 | 2/2014 | Vassigh |
| 8,666,153 B2 | 3/2014 | Hung |
| 8,682,072 B2 | 3/2014 | Sengamedu |
| 8,701,002 B2 | 4/2014 | Grossman |
| 8,723,914 B2 | 5/2014 | Mackie |
| 8,818,028 B2 | 8/2014 | Nguyen |
| 8,854,412 B2 | 10/2014 | Tian |
| 8,874,525 B2 | 10/2014 | Grossman |
| 8,890,923 B2 | 11/2014 | Tian |
| 8,890,929 B2 | 11/2014 | Paithankar |
| 8,913,847 B2 | 12/2014 | Tang |
| 8,994,778 B2 | 3/2015 | Weiser |
| 9,008,457 B2 | 4/2015 | Dikmen |
| 9,053,573 B2 | 6/2015 | Lin |
| 9,087,229 B2 | 7/2015 | Nguyen |
| 9,088,692 B2 | 7/2015 | Carter |
| 9,285,951 B2 | 3/2016 | Makofsky |
| 2002/0051491 A1* | 5/2002 | Challapali et al. ......... 375/240.2 |
| 2002/0158873 A1 | 10/2002 | Williamson |
| 2004/0153671 A1 | 8/2004 | Schuyler |
| 2006/0072022 A1* | 4/2006 | Iwai .............................. 348/239 |
| 2006/0193509 A1* | 8/2006 | Criminisi et al. .............. 382/154 |
| 2006/0259552 A1 | 11/2006 | Mock |
| 2007/0013813 A1* | 1/2007 | Sun ....................... G06T 7/0083 348/587 |
| 2007/0036432 A1* | 2/2007 | Xu et al. ....................... 382/173 |
| 2008/0181507 A1 | 7/2008 | Gope |
| 2008/0273751 A1* | 11/2008 | Yuan et al. ..................... 382/103 |
| 2009/0003687 A1* | 1/2009 | Agarwal et al. ............... 382/154 |
| 2009/0199111 A1 | 8/2009 | Emori |
| 2009/0245571 A1* | 10/2009 | Chien et al. ................... 382/103 |
| 2009/0284627 A1 | 11/2009 | Bando |
| 2009/0300553 A1* | 12/2009 | Pettigrew .............. G06T 7/0085 715/856 |
| 2010/0046830 A1* | 2/2010 | Wang et al. .................... 382/164 |
| 2010/0053212 A1* | 3/2010 | Kang et al. .................... 345/629 |
| 2010/0128927 A1* | 5/2010 | Ikenoue ......................... 382/103 |
| 2010/0302376 A1 | 12/2010 | Boulanger |
| 2011/0242277 A1 | 10/2011 | Do et al. |
| 2011/0249190 A1* | 10/2011 | Nguyen ................. H04N 5/272 348/708 |
| 2011/0249863 A1* | 10/2011 | Ohashi .................. G06T 7/0081 382/103 |
| 2011/0249883 A1* | 10/2011 | Can et al. ...................... 382/133 |
| 2012/0051631 A1* | 3/2012 | Nguyen et al. ................ 382/164 |
| 2013/0016097 A1* | 1/2013 | Coene et al. ................... 345/419 |
| 2013/0110565 A1 | 5/2013 | Means |
| 2013/0142452 A1* | 6/2013 | Shionozaki et al. .......... 382/284 |
| 2013/0243313 A1* | 9/2013 | Civit et al. .................... 382/164 |
| 2014/0003719 A1* | 1/2014 | Bai ....................... G06T 7/2066 382/173 |
| 2014/0029788 A1* | 1/2014 | Kang ............................. 382/103 |
| 2014/0112547 A1 | 4/2014 | Peeper |
| 2014/0119642 A1* | 5/2014 | Lee .................... G06K 9/00281 382/159 |
| 2014/0153784 A1* | 6/2014 | Gandolph et al. ............ 382/107 |
| 2014/0300630 A1 | 10/2014 | Flider |
| 2014/0307056 A1* | 10/2014 | Collet Romea et al. ........ 348/47 |

OTHER PUBLICATIONS

Xu, Fengliang, and Kikuo Fujimura. "Human detection using depth and gray images." Advanced Video and Signal Based Surveillance, 2003. Proceedings. IEEE Conference on. IEEE, 2003.*

Zhang, Qian, and King Ngi Ngan. "Segmentation and tracking multiple objects under occlusion from multiview video." Image Processing, IEEE Transactions on 20.11 (2011): 3308-3313.*

Rother, Carsten, Vladimir Kolmogorov, and Andrew Blake. "Grabcut: Interactive foreground extraction using iterated graph cuts." ACM Transactions on Graphics (TOG) 23.3 (2004): 309-314.*

Arbelaez, Pablo, et al. "Contour detection and hierarchical image segmentation." Pattern Analysis and Machine Intelligence, IEEE Transactions on 33.5 (2011): 898-916.*

Izquierdo, M. Ebroul. "Disparity/segmentation analysis: matching with an adaptive window and depth-driven segmentation." Circuits and Systems for Video Technology, IEEE Transactions on 9.4 (1999): 589-607.*

Gvili et al., "Depth Keying", 2003.

Crabb et al., "Real-Time Foreground Segmentation via Range and Color Imaging", 2008.

Lee, D.S., "Effective Gaussian Mixture Learning for Video Background Subtraction", IEEE, May 2005.

Benezeth et al., "Review and Evaluation of Commonly-Implemented Background Subtraction Algorithms", 2008.

Piccardi, M., "Background Subtraction Techniques: A Review", IEEE, 2004.

Kolmogorov, et al., "Bi-Layer Segmentation of Binocular Stereo Vision", IEEE, 2005.

* cited by examiner

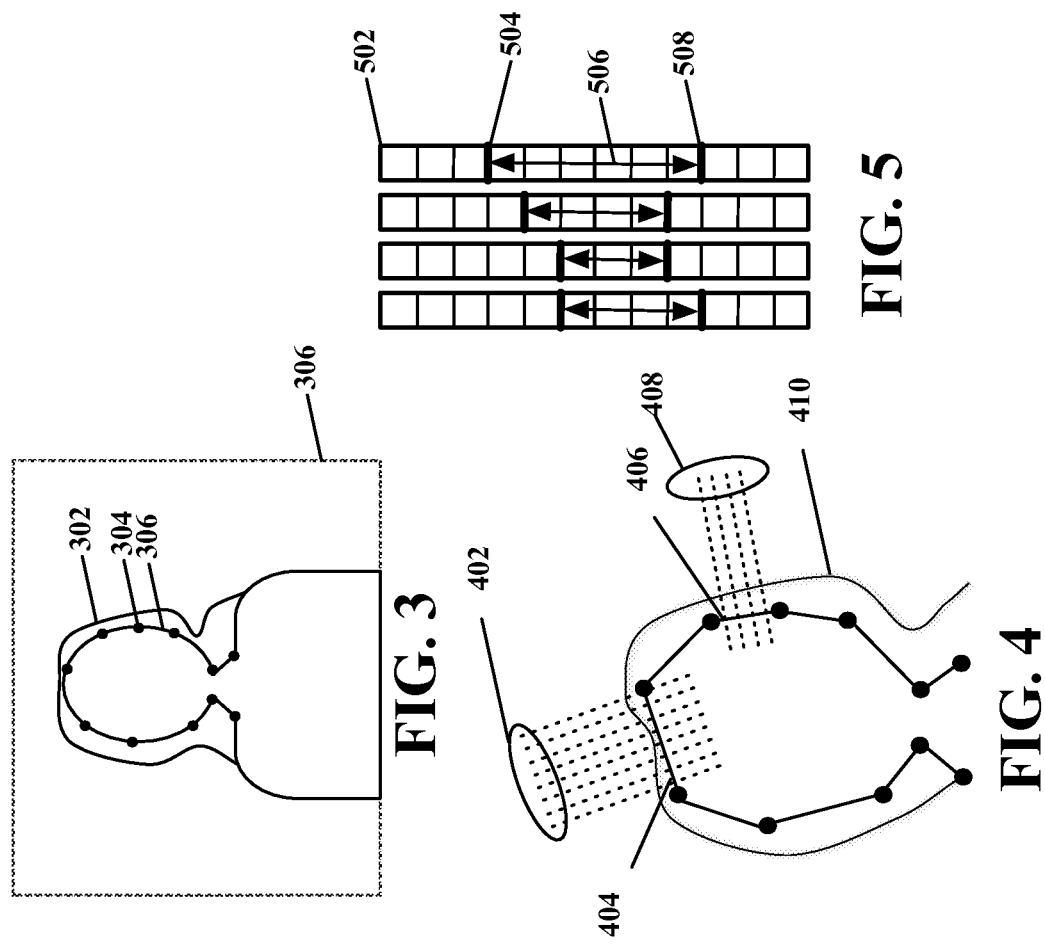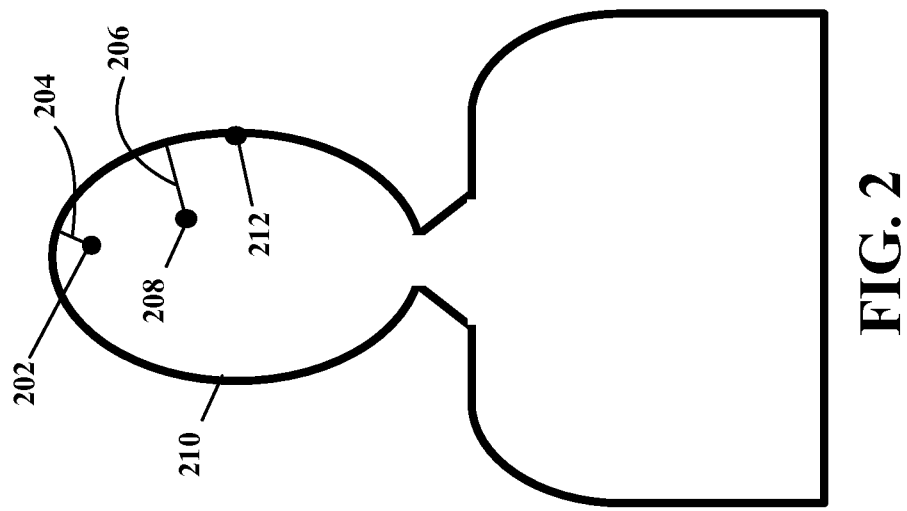

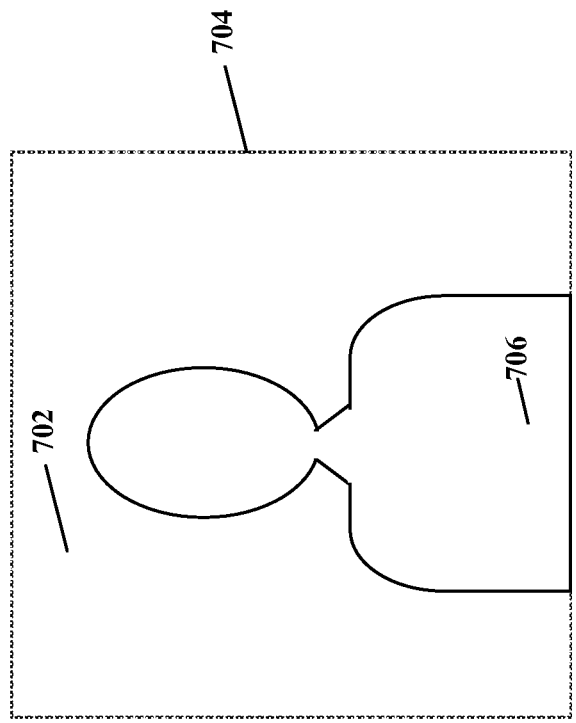
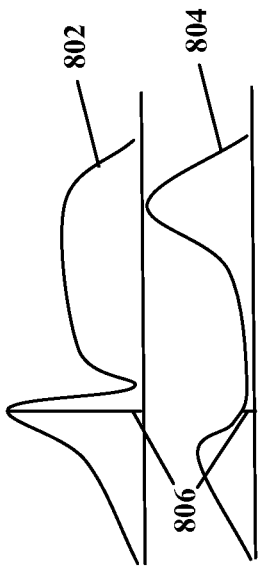
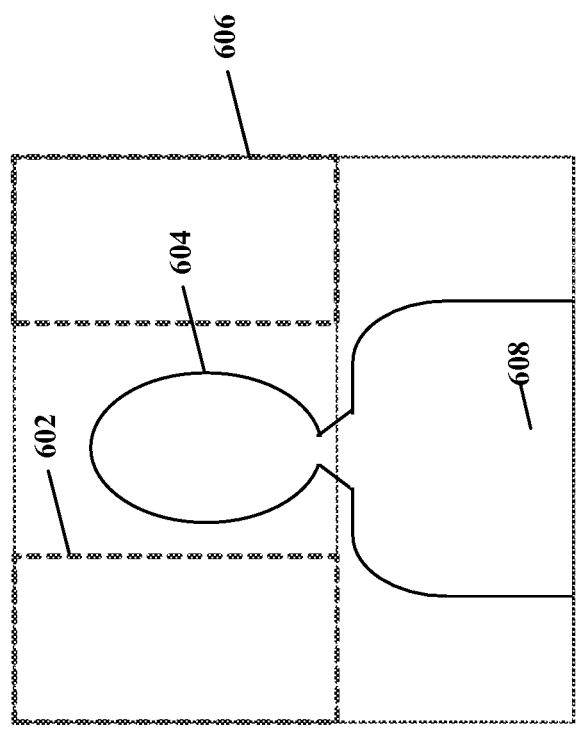

SYSTEM AND METHODS FOR PERSONA IDENTIFICATION USING COMBINED PROBABILITY MAPS

BACKGROUND

Online data communications are quite prevalent and pervasive in modern society, and are becoming more so all the time. Moreover, developments in software, communication protocols, and peripheral devices (e.g., video cameras), along with developments in other computing disciplines, have collectively enabled and facilitated the inclusion of multimedia experiences as part of such communications. Indeed, the multimedia nature and aspects of a given communication session are often the focus and even essence of such communications. These multimedia experiences take forms such as audio chats, video chats (that are usually also audio chats), online meetings (e.g., web meetings), and the like.

Using the context of online meetings as an illustrative example, it is often the case that one of the participants is the designated presenter, and often this designated presenter opts to include some visual materials as part of the offered presentation. Such visual materials may take the form of or at least include visual aids such as shared desktops, multiple-slide presentations, and the like. In some instances, from the perspective of another attendee at the online meeting, only such visual materials are presented on the display of the online meeting, while the presenter participates only as an audio voiceover. In other instances, the presenter may be shown in one region of the display while the visual materials are shown in another. And other similar examples exist as well.

Conventional videoconferencing techniques typically employ a camera mounted at one location and directed at a user. The camera acquires an image of the user and background of the user that is then rendered on the video display of another user. The rendered image typically depicts the user, miscellaneous objects, and background that are within the field-of-view of the acquiring camera. For example, the camera may be mounted on the top edge of a video display within a conference room with the user positioned to view the video display. The camera field-of-view may encompass the user and, in addition, a conference table, chairs, and artwork on the wall behind the user, (i.e., anything else within the field-of-view). Typically, the image of the entire field-of-view is transmitted to the video display of a second user. Thus, much of the video display of the second user is filled with irrelevant, distracting, unappealing, or otherwise undesired information. Such information may diminish the efficiency, efficacy, or simply the esthetic of the videoconference. This reduces the quality of the user experience.

Overview

Improvements over the above-described options are described herein. Among other capabilities and features, this technology extracts what is known as a "persona", which is the image of a person contained within a video feed from a video camera that is capturing video of the person. The extracted persona, which in some examples appears as a depiction of the person from the torso up (i.e., upper torso, shoulders, arms, hands, neck, and head), and in other examples may be a depiction of the entire person from head to foot, is then visually combined by this technology with various other video content. In some embodiments, one person may have the role of a presenter, or multiple people may participate in a panel type discussion, a meeting, or even a simple chat session, where each person may be at a separate location. In some embodiments the persona(s) may be combined with content such as a multiple-slide presentation, such that the presenter appears to the attendees at the online meeting to be superimposed over the content, thus personalizing and otherwise enhancing the attendees' experiences.

As mentioned, this persona extraction is carried out with respect to video data that is being received from a camera that is capturing video of a scene in which the presenter is positioned. The persona-extraction technology substantially continuously (e.g., with respect to each frame) identifies which pixels represent the presenter and which pixels do not.

In some embodiments, a method may comprise: obtaining at least one frame of pixel data and corresponding image depth data; processing the at least one frame of pixel data and the image depth data with a plurality of persona identification modules to generate a corresponding plurality of persona probability maps; combining the plurality of persona probability maps to obtain an aggregate persona probability map; and generating a persona image by extracting pixels from the at least one frame of pixel data based on the aggregate persona probability map. The method may include methods wherein the at least one frame of pixel data comprises two frames of stereo pixel data and the image depth map is obtained from disparity data generated by a stereo disparity module. The method may also include processing the at least one frame of pixel data and the image depth data by generating a foreground-background map from the disparity data by designating pixels having a disparity value above a threshold as foreground pixels.

In further embodiments, the method may include scenarios where the disparity data comprises a plurality of disparity values for each pixel, each of the plurality of disparity values having an associated confidence value, and wherein processing the at least one frame of pixel data and the image depth data comprises generating a foreground-background map from the disparity data by identifying pixels having a cumulative confidence measure above a threshold as foreground pixels. The image depth map may be converted to a foreground-background map using a thresholding operation. The image depth data may be simple depth values, or may be in the form of a cost volume, or a cost volume that is filtered such as by using a semi global matching module.

The method may also include scenarios where the foreground-background map is distance-transformed to obtain a persona probability map. In yet other embodiments, the method may include processing the foreground-background map to obtain a persona head contour, and pixels of the at least one frame of pixel data in a band around the persona head contour are selectively categorized as persona pixels based on a color segmentation.

The aggregate persona probability map may be formed by combining the plurality of persona probability maps using predetermined weights. And the predetermined weights may be preset or may be selected according to an image capture environment, or according to user feedback.

The method may include extracting pixels using a graph-cut-based persona extraction module, an active-shape-based persona shape recognition module, or an active-contour-based persona extraction module.

Related technology is also described in the following patent documents, each of which is incorporated in its respective entirety into this disclosure: (i) U.S. patent application Ser. No. 13/083,470, entitled "Systems and Methods for Accurate User Foreground Video Extraction," filed Apr. 8, 2011 and published Oct. 13, 2011 as U.S. Patent Application Pub. No. US2011/0249190 and (ii) U.S. patent application Ser. No. 13/076,264, entitled "Systems and Methods for Embedding a Foreground Video into a Background Feed based on a Control Input," filed Mar. 30, 2011 and published Oct. 6, 2011 as U.S. Patent Application Pub. No. US2011/0242277.

The above overview is provided by way of example and not limitation, as those having ordinary skill in the relevant art may well implement the disclosed systems and methods using one or more equivalent components, structures, devices, and the like, and may combine and/or distribute certain functions in equivalent though different ways, without departing from the scope and spirit of this disclosure.

BRIEF DESCRIPTION OF THE DRAWINGS

A more detailed understanding may be had from the following description, which is presented by way of example in conjunction with the following drawings, in which like reference numerals are used across the drawings in connection with like elements.

FIG. 2 depicts the operation of a persona identification module according to an embodiment.

FIG. 3 depicts a persona contour in accordance with at least one embodiment of a persona identification module.

FIG. 4 depicts the operation of a persona identification module, in accordance with at least one embodiment.

FIG. 5 depicts a segmentation operation of a persona identification module in accordance with at least one embodiment.

FIG. 6 depicts a segmentation operation of a persona identification module in accordance with at least one embodiment.

FIGS. 7 and 8 depict a histogram operation of a persona identification module in accordance with at least one embodiment.

DETAILED DESCRIPTION

Figure 1:
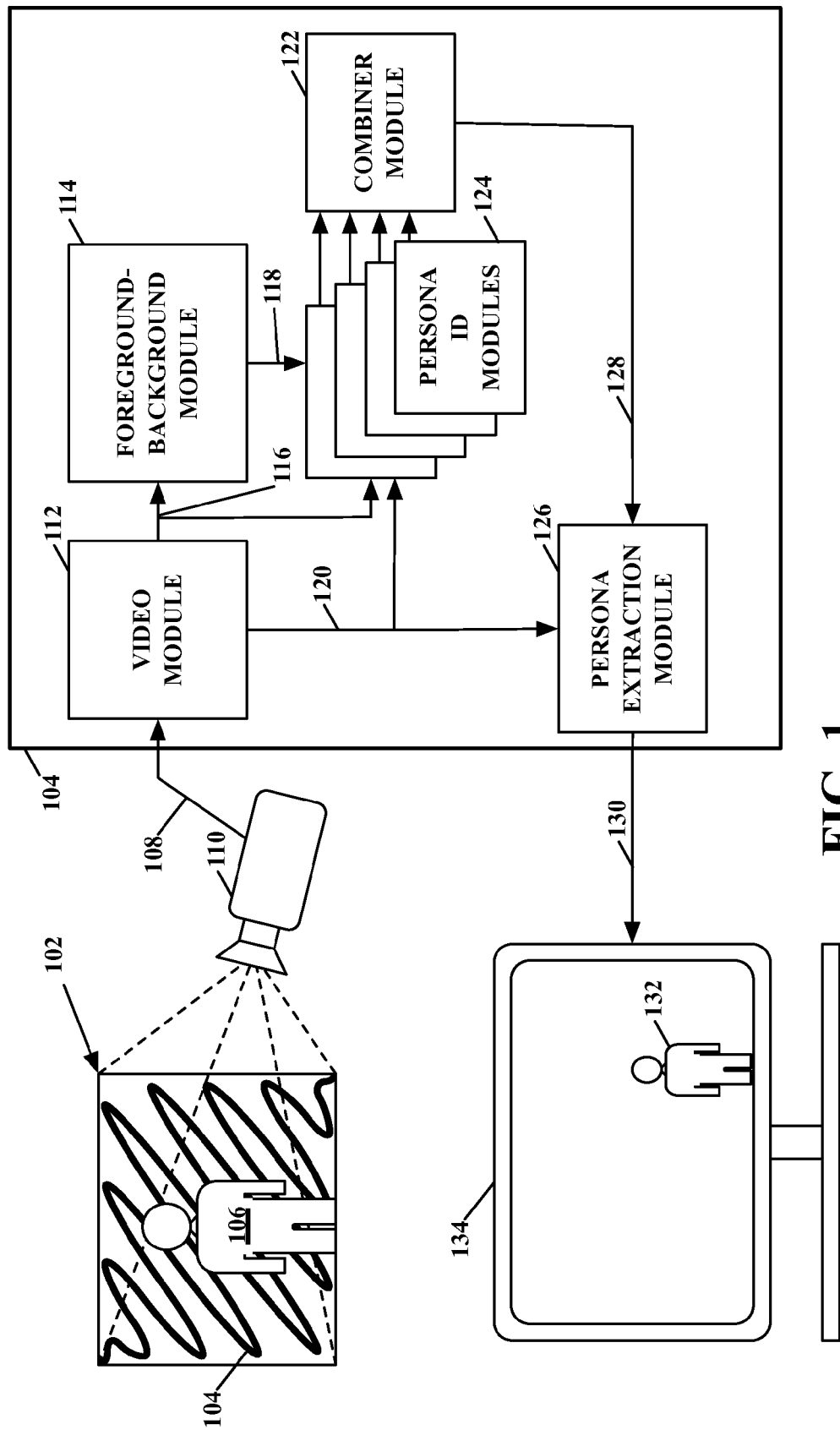
FIG. 1 depicts an image capture and persona-processing apparatus.

FIG. 1 depicts a camera 110 capturing an image of scene 102 that includes a person 106 and her surroundings 104. The camera 110 may use any one of a number of different image depth determination technologies to generate image depth data, including time-of-flight, structured light, and stereoscopic imaging. The camera 110 provides image data over connection 108 to a computing device 104. The image data may include frames of image pixel data and corresponding image depth data. In some embodiments, the camera may be configured with sufficient signal processing hardware resources to generate the image depth data, while in other embodiments, the signal processing hardware resources may reside in computing device 104, such as in video module 112. The camera 110 may be an external peripheral device connected via a Universal Serial Bus (USB) connection or may be more highly-integrated into computing device 104.

Computing device 104 may take the form of a desktop computer, laptop computer, tablet computer, smart phone, or the like. In the embodiment shown in FIG. 1, in includes a video module 112, a foreground-background module 114, persona identification modules 124, a combiner module 122, and a persona extraction module 126. The computing device 104 may then provide a video output over communication link 130 for display on display device 134. The video output includes image data of a persona 132 representative of the person 106, but without the background image data associated with the background 104 from the scene 102.

The preceding paragraph is an example of the fact that, in the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module may also include instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Again with respect to FIG. 1, video module 112 may include a video driver module to communicate with the camera 110. It may be configured to provide image depth data received from the camera 110 to the foreground-background module 114 via connection 116. Such a data transfer may be performed by the use of data memory storage devices as is known in the art. Similarly, image pixel data representative of the scene 102 may be conveyed to the persona ID modules 124 and to persona extraction module 126 as shown by connection 120.

In some embodiments, video module 112 may be configured to receive stereo images from camera 112, and responsively generate image depth data 116. The image depth data may be generated by forming a disparity map, where each pixel location is associated with a disparity value representing the distance of that pixel from the camera. In some embodiments, the depth data is a single depth value corresponding to each pixel location, while in other embodiments, the depth data is in the form of a cost volume (e.g., a disparity data volume), where at each pixel location, each possible depth is assigned a value representing a measure of confidence that the pixel corresponds to the respective depth. The depth data 116, either as a depth map or cost volume, is provided to the foreground-background module 114.

The foreground-background module 114 is configured to generate a foreground-background map from the depth data. In some embodiments, the foreground-background module 114 separates the pixel locations into a foreground and a background by designating each pixel as belonging to either a "foreground" image or "background" image. In some embodiments, the foreground-background module 114 includes a third value of "uncertain" to indicate uncertainty regarding the pixel's status of foreground or background. In one embodiment, the foreground-background module 114 operates on a depth map (e.g., where each pixel location has a single depth value) by designating every pixel location having a depth less than a threshold as a foreground pixel. The particular threshold may be predetermined according to the camera location and environment, such as if it is a built-in laptop/tablet computer.

In a further embodiment, the foreground-background module 114 operates on a cost volume (e.g., where each pixel location has a set of cost values, one for each possible depth value) to determine the foreground-background map. In one such embodiment, the costs may be accumulated for one or more ranges of possible depth values to determine whether the pixel location is foreground or background. Thus, the costs for depth values of between 0 and 1 meter may be accumulated, and the costs for depth values greater than one meter may be accumulated, and the pixel may be designated as foreground or background depending on the lesser accumulated cost. Alternatively, the costs for depth values of a first range (e.g., between 0 and 1 meter) may be accumulated and compared to a threshold to determine if the pixel is to be designated a foreground pixel. In yet a further embodiment, the foreground-background module 114 may filter depth data in the form of a cost volume by performing a semi-global matching operation, wherein possible paths through the cost volume are evaluated along a plurality of directions. The resulting filtered cost volume may then be evaluated by selecting the most likely depth value, followed by a thresholding operation, or by a range accumulation operation as described above.

The persona ID modules 124 operate on the depth data as shown by arrow 116, on the foreground-background map as shown by connection 118, or on the image pixel data shown by connection 120, or on both the foreground-background map and the image pixel data. Each of the persona ID modules 124 generates a probability map indicating a likelihood that the respective pixels are part of a foreground image as compared to a background image. The persona ID modules, as described more fully below, are configured to operate on certain characteristics of the image and/or depth data to identify characteristics of the data indicative of a person's presence in the scene 102. The respective probability maps are then combined by combiner module 122 to provide an aggregate probability map. In some embodiments, the individual probability maps are in the form of a log-likelihood ratio:

$$\log_{10}\left(\frac{P(f \mid x)}{P(b \mid x)}\right),$$

which represents the logarithm of the ratio of the probability that the pixel "x" is a foreground ("f") pixel versus a background ("b") pixel. Thus, a value of 1 represents a likelihood that the pixel being in the foreground is ten times more likely than being in the background, a value of −1 represents a likelihood that the pixel being in the background is ten times that of being in the foreground, while a value of 0 represents and equal likelihood of a pixel being in the foreground or background (that is, a likelihood ratio of 1 has a log-likelihood of 0). In such an embodiment, the combiner module 122 may combine the probability maps by forming a weighted sum of the plurality of maps on a pixel-by-pixel basis. Note that the probability maps need not be rigorously derived from probability theory, but may also be based on heuristic algorithms that provide approximations of relative likelihoods of a pixel being either a foreground or background pixel.

In one embodiment of a persona extraction module, FIG. 2 depicts the operation of a distance transform operating on the foreground-background map data. In particular, a foreground region is designated by contour line 210, while example pixel 212 is located on the line 210, pixel 202 is located a distance 204 from the line 210, and pixel 208 is located a distance 206 from the line 210. The distance transform applies a value to each location that is based on its distance from the contour line 210. In one embodiment, the probability value (e.g., a probability, a likelihood ratio, or a log-likelihood ratio) for a given pixel location within the foreground region 210 is based on the square of the distance from the nearest contour point ($d^2$). In a further embodiment, the probability is a scaled measure of the distance (cd). In a further embodiment, the log-likelihood is a scaled version of the square of the distance ($cd^2$). In yet a further embodiment, only the distance over a threshold t is used to determine the likelihood (e.g., $(d-t)^2$), and where the pixels within a threshold region are given an equal foreground-background weight of 0.

In a further embodiment of persona identification module 124, an algorithm is utilized to better identify pixels associated with a person's hair. This persona identification module operates on a combination of the foreground-background map and the image pixel data. In particular, depth information is often fairly reliable with respect to a person's face: facial features provide good textures for providing disparity data for embodiments using stereo depth data, as well as good infrared illumination for time-of flight depth technologies. However, human hair tends to scatter IR light, and is relatively featureless with respect to disparity information. Thus, to improve foreground and background separation in a hair region, the following processing may be performed in accordance with a hair detection algorithm: identify head contour points; determine a plurality of image pixel columns; segment pixels according to pixel value centroids; assign probability measures according to determined segments.

Initially, as shown in FIG. 3, the foreground-background map is analyzed to find certain points of interest. The contour line 306 may be analyzed to identify parts of a human body, such as a large rectangular region, which may be determined to be part of a torso. Then a neck and head region may be identified by analyzing further geometric aspects of the contour, such as identifying a smaller rectangular region centered or within the side-t-side boundaries of the torso rectangle. Image pixels corresponding to locations normal to the points along the head region of the contour line may be placed into columns and analyzed. In some embodiments, the contour line may be simplified by representing the contour in the form of line segments connecting points identified along the contour line. In this embodiment, from the identification of the head, points 304 along the head region of the contour line 306 may be identified, by for example, using the OpenCV library (a well-known open source computer vision library originally developed by Intel) call "find contour", which provides a polygon approximation of a given contour line. Having identified the points 304 of FIG. 3 that define line segments 404, 406 as shown in FIG. 4, the pixel columns may be formed by forming pixel columns as indicated, for example, by columns 402, 408, corresponding to line segments 404, 406. Thus, given two points along the person's head (provided, e.g., by "find contour"), the algorithm iterates from one point to the other along the line, and at every point, it selects the normal segment (for example 50 pixels towards the background region and 20 pixels towards the foreground region). These pixel columns define short segments of image data located along the points along the person's hairline. Each of these columns is likely to have part of the person's head, part of the hair, and part of the background scene.

The color information of each column may then be evaluated to determine boundaries between facial colors, hair colors, and background colors. Such segmentation may be performed using a k-means algorithms. The k-means algorithm operates by declaring a number of desired centroids, which in some embodiments is k=3. The algorithm then divides the data of each column into three segments as shown in FIG. 5. For example, pixel column 502 is divided into three segments demarcated by lines 504, 508. The region indicated by line 506 is then determined to be pixels corresponding to hair, and is assigned a relatively high probability measure. In one embodiment, pixel locations outside of region 506 are given a value of 0 (equally likely) while pixel locations within region 506 are assigned a constant value, which in one embodiment is a value of 10. In some embodiments the k-means algorithm may be initialized by setting a value for the face, hair and head regions based on three predetermined ranges of pixels, where the initial face color is set to the average of the closest pixels, and the background color is initialized to be the average of the last few pixels, and the hair is initialized as the average of boundary of foreground and background (e.g., ten pixels above and ten pixels below).

In some embodiments, additional verification steps may be performed, such as ensuring three regions exist. Further, a verification step may be performed to ensure the resulting hair color is not too close to background color, which might indicate that no hair is in fact present in the image column.

In a further embodiment, a persona id module 124 may operate on image pixel data only. The operation of one such persona id module is depicted in FIG. 6. This module identifies regions in the pixel data having a high degree of uniformity that may be indicative of a wall in a background region. The variation of pixel values within a sliding window may be evaluated, and regions with low variance may be identified as background and a persona probability map may be generated having negative values for those regions. In an alternative embodiment, the search for regions of uniform variance may be limited to regions 602, 606, located above the torso region 608 and/or on either side of head contour.

In a further embodiment, another persona id module 124 may operate on image pixel data only by using color histograms as shown in FIGS. 7 and 8. In particular, a histogram, or histogram average (or normalized versions thereof), may be generated for both the foreground region 706 (foreground histogram 802) and background region 702 (background histogram 804). In some embodiments, the foreground and background histograms may be determined by the final determination of the persona region as determined by the persona extraction module 126 (described below). This method of updating the histograms provides a relatively aggressive revision of the foreground/background histograms. In further embodiments, the foreground and background histograms may be determined based on the colors in the respective regions of the foreground-background regions as determined by the foreground-background module 114. This method of updating the histograms provides a relatively conservative revision of the foreground/background histograms in that it is based primarily on thresholded depth data. Furthermore, regions characterized as "uncertain" in the foreground-background map may be disregarded when updating the histograms.

In these histogram-based embodiments of the persona id module 124, each pixel of the image may be evaluated in terms of the occurrence of that color in the foreground histogram versus the occurrence of that color in the background histogram, and a respective ratio is formed. The map of the foreground/background histogram ratios thus forms a persona probability map. Note that normalized color histograms (histograms that sum to one) provide direct measures of the probability that the given color is present in the foreground (or background, as the case may be). In some embodiments, an epsilson value may be added to each histogram value to prevent a divide-by-zero error.

In a further embodiment of persona identification module 124, depth data in the form of a cost volume may be converted directly to a probability map. In this embodiment, the relative foreground and background probabilities may be determined from the cost volume, and a likelihood ratio may be generated therefrom. It will be recognized by those of skill in the art that there exist a number of equivalent formula that may be used to calculate the desired quantities. For example, when working with log likelihoods, the log of a ratio is the difference between the log of the numerator minus the log of the denominator, such that $$\log(fg\_score+\epsilon) - \log(bg\_score+\epsilon) = \log((fg\_score+\epsilon)/(bg\_score+\epsilon)),$$

where fg_score is the inverse of the foreground cost, bg_score is the inverse of the background cost, and $\epsilon$ is a small value to prevent division by zero or infinite log values.

In some embodiments, the relative foreground and background probabilities may be determined by using the smallest cost value in a range of depths likely to be foreground and the smallest cost in the range of depths likely to be background. Again, the relative ranges may be determined by the particular camera configurations in use, or by other means. An alternative method of determining the relative foreground and background probabilities is by aggregating the costs (or 1/cost) for disparity values greater than or equal to two, and divide by aggregated 1/cost for low disparity values.

In further embodiments, more sophisticated approaches may be used. In one such example, a data-driven approach is used whereby a regression is run against training data (which may have ground truth disparity labels) to determine a model. In yet other embodiments, the conversion of a cost (where large values indicate undesirability) to a score (where large values are indicative of high confidence) may be manipulated. That is, instead of using a monotonically decreasing function, such as 1/x as described above, the regression may be used to produce a probability or score instead.

In some embodiments, the modular persona id modules may be combined dynamically based on one or more factors including: (i) image capture conditions such as lighting, persona distance, and/or (ii) processing power available such as a desktop or laptop having a given amount of processing power, versus a smart phone device having relatively less processing power and/or (iii) power source availability (battery level or wired) and/or (iv) communication bandwidth available to transmit video-encoded persona data and/or (v) user feedback indicating which weight set provides a desired result as determined by the user. The factors may be used to determine which persona id modules to use, or which combination of persona id modules to use. The modules may be ranked according to performance under certain lighting conditions or by required processing power such that in a given lighting condition or given processing resources, the best combination of modules may be utilized.

In further embodiments, weights may be used by the combiner module 122 to combine the persona probability maps. In some embodiments, a set of weights may be applied to the maps of the respective modules that have been determine to perform well in order to compute the aggregate persona probability map. In other embodiments, a plurality of sets of weights may be available, where each set of weights performs best according to the given conditions (lighting, processing power, etc.) The set of weights may be selected dynamically based on current conditions detected by the computing device.

The persona extraction module 126 of computing device 104 then operates on the aggregate persona probability map as indicated from line 128 from combiner module 122. In one embodiment, a graph cut utility (such as what is available from within the OpenCV library). In such an embodiment, the segmentation of the persona extraction may be formulated as a mincut/maxflow problem. In this case, the image is mapped into a graph, and each pixel is mapped to a node. In addition, there are two additional special nodes called the source and the sink. The node for each image pixel is connected to both the source and the sink. If the aggregate persona probability map indicates that that pixel is likely to be foreground, a weight is applied to the edge linking the pixel to the source. If the aggregate persona probability map indicates that that pixel is likely to be background, a weight is applied to the edge linking the pixel to the sink. The magnitude of the weight increases as the probability becomes more certain. In addition, edges are included that link the nodes for a pixel to the nodes of a neighboring pixel. The weights of these nodes are inversely proportional to the likelihood of a boundary appearing there. One possible technique is to set these weights to be large if the two pixels are similar in color and set them to be small if the two pixels are not. Thus, transitioning from foreground to background is favored in areas where the color is also changing. The mincut problem is then solved by configuring the algorithm to remove edges from the graph until the source is no longer connected to the sink. (The algorithm will minimize the total weight of the edges it removes.) Since the node for each pixel is connected to both the source and the sink, one of those edges must be removed by the cut. If the node remains connected to the source (the edge to the sink was removed), that pixel is marked as foreground. Otherwise, the node is connected to the sink (the edge to the source was removed), and that pixel is marked as background. The formulation described may be solved efficiently through a variety of techniques.

In an alternative embodiment, the persona extraction module 126 may utilize an active contour model to operate on the aggregate persona probability map. The active contour model (also known as "snake") may be used for segmentation and tracking. It does this by minimizing the combination of an external energy (to cause the contour to snap to image boundaries) and an internal energy (to keep the contour from becoming too convoluted). In one embodiment, one or more closed contours are used such that each contour will have an "inside" portion. The aggregate probability map is processed by an external energy function that favors including regions of high foreground probability and disfavors including regions of high background probability. In a further embodiment, more traditional terms for external energy may be used that favor high gradient regions in the image. In further embodiments, the internal energy term may include the commonly accepted terms.

In some embodiments, the active contour model is initialized using an initial contour produced from another module, such as a foreground-background map as described above, or a thresholded version of the aggregate persona probability map, or by a graph cut module determination of foreground/background, or the like. As the user moves in the video, the active contour model may be updated frame-by-frame. Some embodiments may periodically check to determine whether a contour needs to be reinitialized, such as if the enclosed area grows too small, if the aggregate foreground probability of the enclosed region drops too low, or if the combined set of contours fails to explain all the high aggregate foreground probability regions.

In some embodiments, the active contour module may directly generate the persona alpha mask, but in alternative embodiments, the active contour model may instead modify the aggregate persona probability map that is then processed by a different persona extraction module.

In yet a further alternative embodiment, the persona extraction module 126 may utilize an active shape model to operate on the aggregate persona probability map. The active shape model (ASM) is a technique to identify a deformable object in a scene. The model itself comprises a basic shape and the ways that this shape can vary in individual instances. The module models a single torso/neck/head in the scene with an ASM, the parameters of which may be learned from a training corpus.

In some embodiments, the ASM module is configured to operate on the aggregated persona probability map. That is, the ASM fitting algorithm favors enclosing regions of high foreground probability and disfavor enclosing regions of high background probability. Some embodiments may also favor placing the occluding contour of the person along edges in the image.

The ASM fitting process may also be initialized using the foreground-background map or a thresholded version of the aggregate persona probability map. Alternatively, a graph cut may be used to produce an initial shape. As the user moves in the video, the model parameters are updated frame-by-frame. Possible conditions for reinitialization is if the enclosed area grows too small or if the aggregate probability of the enclosed region drops too low.

Some embodiments utilize a hybrid approach where the head and torso of the persona are extracted using ASM, while arms and fingers are modeled as articulated objects rather than deformable objects. Once the ASM is used to fit the persona, the shoulders are identified and an arm segmentation model is used. In a further embodiment, an active contour is initialized from the ASM. In a further embodiment, the persona probability map is updated or modified instead of directly generating the alpha mask. This updated map is then provided to a different persona extraction module.

In some embodiments, the persona extraction module may identify the pixel locations belonging to the desired persona by generating an "alpha mask" (e.g., generates an alpha mask for each frame), where a given alpha mask may take the form of or at least include an array with a respective stored data element corresponding to each pixel in the corresponding frame, where such stored data elements are individually and respectively set equal to 1 (one) for each presenter pixel and to 0 (zero) for every other pixel (i.e., for each non-presenter (a.k.a. background) pixel).

The described alpha masks correspond in name with the definition of the "A" in the "RGBA" pixel-data format known to those of skill in the art, where "R" is a red-color value, "G" is a green-color value, "B" is a blue-color value, and "A" is an alpha value ranging from 0 (complete transparency) to 1 (complete opacity). When merging an extracted persona with content, the above-referenced Personify technology creates the above-mentioned merged display in a manner consistent with these conventions; in particular, on a pixel-by-pixel (i.e., pixel-wise) basis, the merging is carried out using pixels from the captured video frame for which the corresponding alpha-mask values equal 1, and otherwise using pixels from the content.

Figure 9:
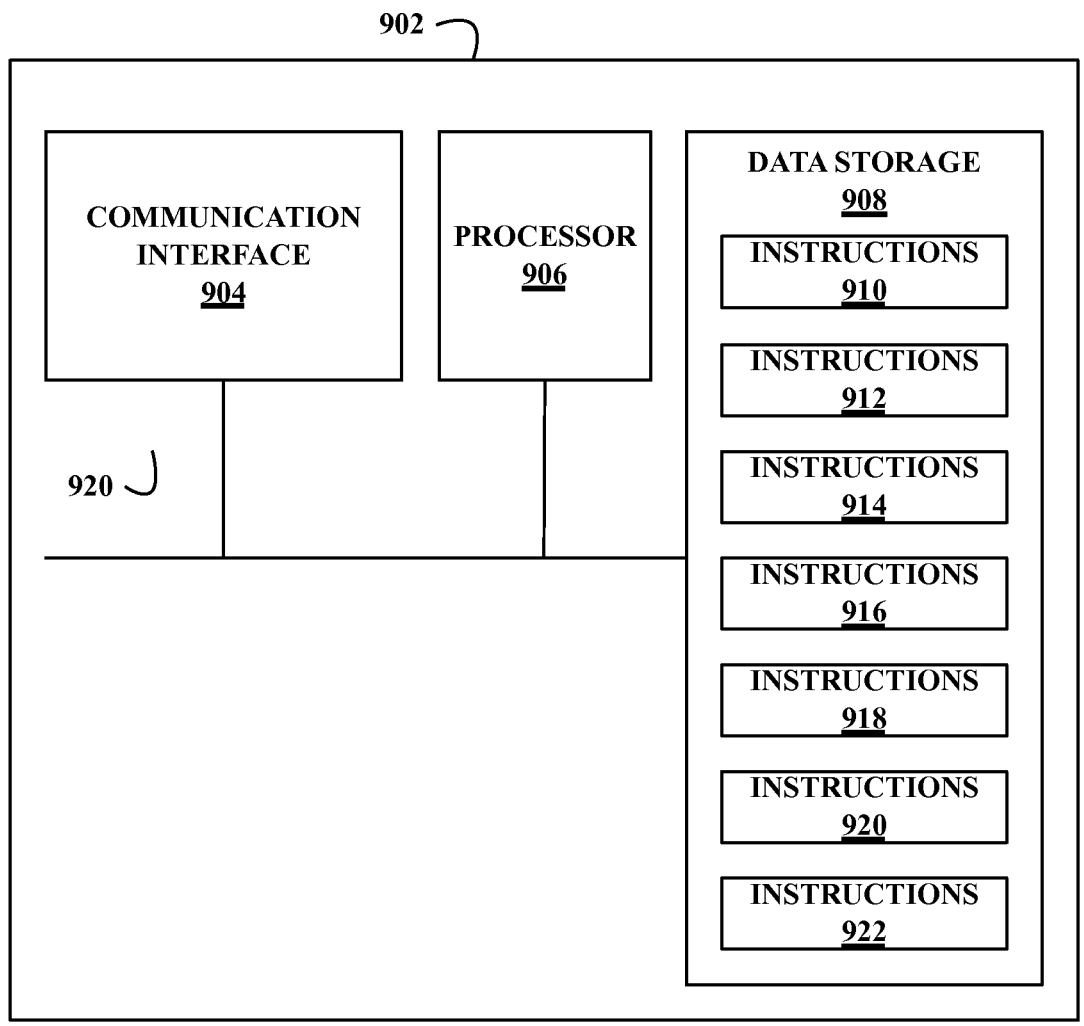
FIG. 9 depicts a hardware configuration in accordance with an embodiment.

In embodiments shown in FIG. 9, an apparatus comprises: a foreground-background module including executable instructions 910 is configured to generate a foreground-background map based on image depth data; a plurality of persona identification modules including executable instructions (912—distance transform; 914—hair detection; 916—low variance detector; 918—histogram detector) is configured to generate a corresponding plurality of persona probability maps stored in data storage 908; a combiner module including executable instructions 920 configured to generate an aggregate persona probability map based on the plurality of persona probability maps; and a persona extraction module including executable instructions 922 configured to generate a persona image by extracting pixels from at least one frame of pixel data based on the aggregate persona probability map.

The persona identification modules are configured to operate on the image depth data, or the image pixel data, or both the image depth data and the image pixel data as described above. The apparatus may also include a video module configured to generate the depth data from a plurality of frames of image pixel data. The persona extraction module may be configured to perform a graph cut operation, an active-shape-based or active-contour-based algorithm.

Figure 10:
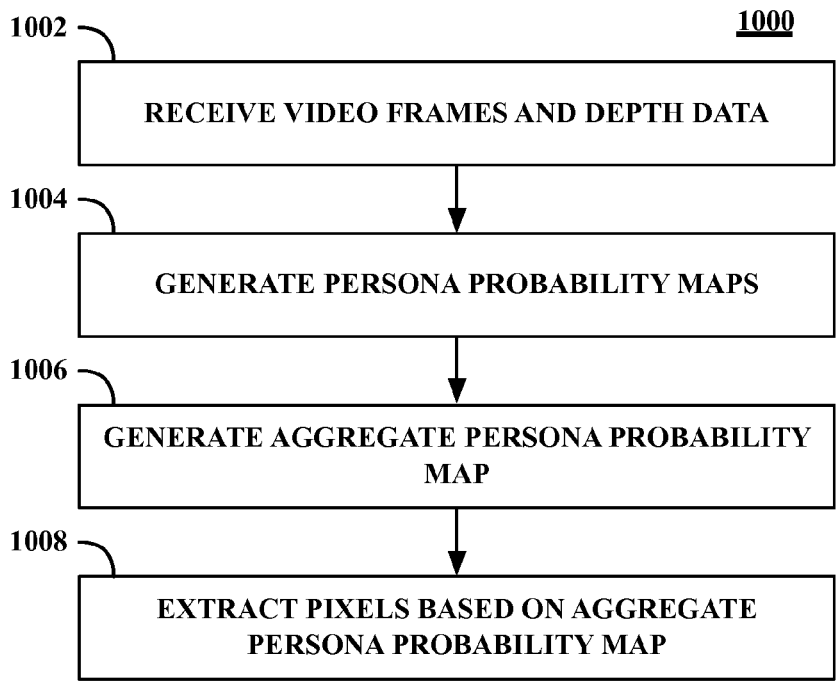
FIGS. 10 and 11 depict methods of persona extraction in accordance with some embodiments.

With respect to FIG. 10, a method 1000 may comprise: obtaining 1002 at least one frame of pixel data and corresponding image depth data; processing 1004 the at least one frame of pixel data and the image depth data with a plurality of persona identification modules to generate a corresponding plurality of persona probability maps; combining 1006 the plurality of persona probability maps to obtain an aggregate persona probability map; and 1008 generating a persona image by extracting pixels from the at least one frame of pixel data based on the aggregate persona probability map. The method 1000 may include methods wherein the at least one frame of pixel data comprises two frames of stereo pixel data and the image depth map is obtained from disparity data generated by a stereo disparity module. The method may also include processing the at least one frame of pixel data and the image depth data by generating a foreground-background map from the disparity data by designating pixels having a disparity value above a threshold as foreground pixels.

In further embodiments, the method may include scenarios where the disparity data comprises a plurality of disparity values for each pixel, each of the plurality of disparity values having an associated confidence value, and wherein processing the at least one frame of pixel data and the image depth data comprises generating a foreground-background map from the disparity data by identifying pixels having a cumulative confidence measure above a threshold as foreground pixels. The image depth map may be converted to a foreground-background map using a thresholding operation. The method may also include scenarios where the foreground-background map is distance-transformed to obtain a persona probability map.

In yet other embodiments, the method may include processing the foreground-background map to obtain a persona head contour, and pixels of the at least one frame of pixel data in a band around the persona head contour are selectively categorized as persona pixels based on a color segmentation. The image depth data may be simple depth values, or may be in the form of a cost volume, or a cost volume that is filtered such as by using a semi global matching module.

The method may include extracting pixels using a graph-cut-based persona extraction module, an active-shape-based persona shape recognition module, or an active-contour-based persona extraction module.

The aggregate persona probability map may be formed by combining the plurality of persona probability maps using predetermined weights. And the predetermined weights may be preset or may be selected according to an image capture environment, or according to user feedback.

Figure 11:
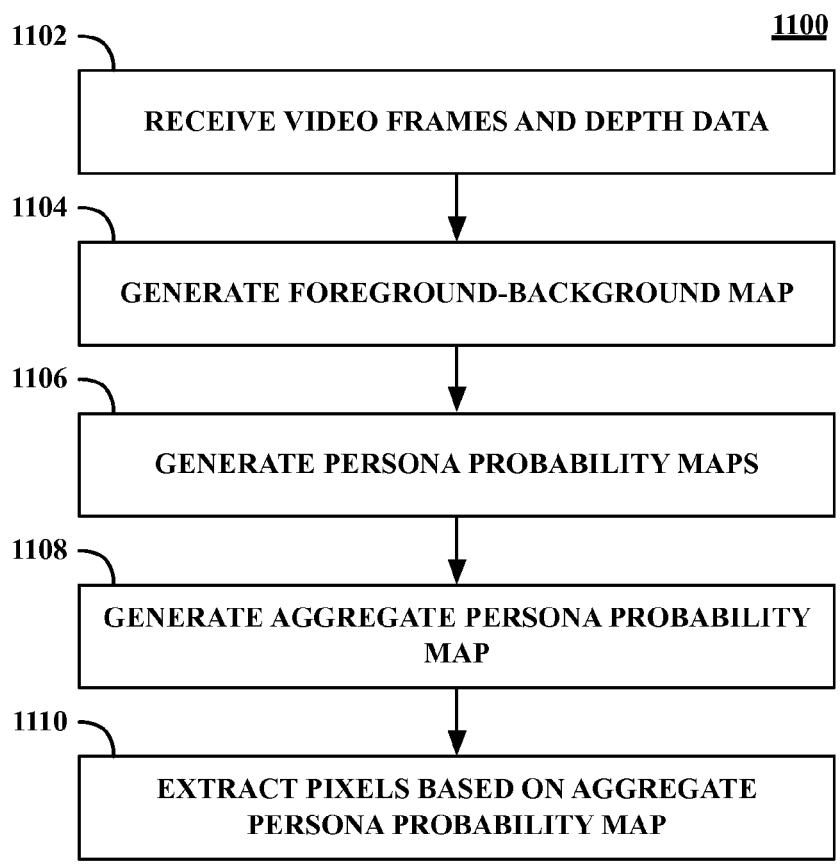

With respect to FIG. 11, a method 1100 comprises: obtaining 1102 at least one frame of pixel data and corresponding image depth data; processing 1104 the image depth data to generate a foreground-background map; processing 1106 the at least one frame of pixel data and the foreground-background map to generate a plurality of persona probability maps; combining 1108 the plurality of persona probability maps to obtain an aggregate persona probability map; and generating 1110 a persona image by extracting pixels from the at least one frame of pixel data based on the aggregate persona probability map. The foreground-background map may be generated from a cost data volume. Processing the at least one frame of pixel data and the foreground-background map may include performing a distance transform on the foreground-background map to generate a first persona probability map and performing a color segmentation of pixels from the at least one frame of pixel data adjacent to a head contour associated with the foreground-background map to generate a second persona probability map.

Although features and elements are described above in particular combinations, those having ordinary skill in the art will appreciate that each feature or element can be used alone or in any combination with the other features and elements without departing from the scope and spirit of the present disclosure.

What is claimed is:

1. A method comprising:
    obtaining at least one frame of pixel data and corresponding image depth data;
    processing the at least one frame of pixel data and the corresponding image depth data with a plurality of persona identification modules to generate a corresponding plurality of persona probability maps, wherein the plurality of persona probability maps includes a hair-identification-module persona probability map, and wherein the plurality of persona identification modules comprises a hair-identification module for generating the hair-identification-module probability map at least in part by:
        identifying a plurality of pixel columns that cross an identified head contour; and
        for each pixel column in the plurality of pixel columns:
            performing a color-based segmentation of the pixels in the pixel column into a foreground segment, a hair segment, and a background segment; and
            assigning the pixels in the hair segment an increased foreground-probability value in the hair-identification-module persona probability map;
    combining the plurality of persona probability maps to obtain an aggregate persona probability map; and
    generating a persona image by extracting pixels from the at least one frame of pixel data based on the aggregate persona probability map.

2. The method of claim 1, wherein:
    the at least one frame of pixel data comprises two frames of stereo pixel data; and
    the corresponding image depth data is obtained from disparity data generated by a stereo disparity module.

3. The method of claim 2, wherein processing the at least one frame of pixel data and the corresponding image depth data comprises:
    generating a foreground-background map from the disparity data by designating pixels having a disparity value above a threshold as foreground pixels.

4. The method of claim 2, wherein:
    the disparity data comprises a plurality of disparity values for each pixel, each of the plurality of disparity values having an associated confidence value; and
    processing the at least one frame of pixel data and the corresponding image depth data comprises generating a foreground-background map from the disparity data by identifying pixels having a cumulative confidence measure above a threshold as foreground pixels.

5. The method of claim 1, wherein processing the at least one frame of pixel data and the corresponding image depth data comprises converting the corresponding image depth data to a foreground-background map using a thresholding operation.

6. The method of claim 5, wherein processing the at least one frame of pixel data and the corresponding image depth data further comprises performing a distance transform on the foreground-background map to obtain a persona probability map.

7. The method of claim 1, wherein extracting pixels is performed using a graph cut module.

8. The method of claim 1, wherein the aggregate persona probability map is formed by combining the plurality of persona probability maps using predetermined weights.

9. A method comprising:
obtaining at least one frame of pixel data and corresponding image depth data;
processing the corresponding image depth data to generate a foreground-background map;
processing the at least one frame of pixel data and the foreground-background map to generate a plurality of persona probability maps at least in part through use of a hair-identification module, wherein the plurality of persona probability maps includes a hair-identification-module persona probability map that is generated by the hair-identification module at least in part by:
identifying a plurality of pixel columns that cross an identified head contour; and
for each pixel column in the plurality of pixel columns:
performing a color-based segmentation of the pixels in the pixel column into a foreground segment, a hair segment, and a background; and
assigning the pixels in the hair segment an increased foreground-probability value in the hair-identification-module persona probability map;
combining the plurality of persona probability maps to obtain an aggregate persona probability map; and
generating a persona image by extracting pixels from the at least one frame of pixel data based on the aggregate persona probability map.

10. The method of claim 9, wherein the foreground-background map is generated from a disparity data volume.

11. The method of claim 9, wherein processing the at least one frame of pixel data and the foreground-background map to generate a plurality of persona probability maps comprises:
performing a distance transform on the foreground-background map to generate a persona probability map.

12. An apparatus comprising:
a foreground-background module configured to generate a foreground-background map based on image depth data;
a plurality of persona identification modules configured to generate a corresponding plurality of persona probability maps, wherein the plurality of persona identification modules comprises a hair-identification module, wherein the plurality of persona probability maps includes a hair-identification-module persona probability map that is generated by the hair-identification module at least in part by:
identifying a plurality of pixel columns that cross an identified head contour; and
for each pixel column in the plurality of pixel columns:
performing a color-based segmentation of the pixels in the pixel column into a foreground segment, a hair segment, and a background segment; and
assigning the pixels in the hair segment an increased foreground-probability value in the hair-identification-module persona probability map;
a combiner module configured to generate an aggregate persona probability map based on the plurality of persona probability maps; and
a persona extraction module configured to generate a persona image by extracting pixels from at least one frame of pixel data based on the aggregate persona probability map.

13. The method of claim 1, further comprising converting the head contour into a multi-segment polygon that approximates the head contour, the multi-segment polygon being formed of multiple head-contour segments, wherein identifying the plurality of pixel columns that cross the identified head contour comprises identifying pixel columns that cross one of the head-contour segments.

14. The method of claim 1, wherein performing a color-based segmentation comprises performing a color-based segmentation using a clustering algorithm.

15. The method of claim 14, wherein the clustering algorithm is a k-means algorithm with k=3.

16. The method of claim 1, wherein performing the color-based segmentation of the pixels in a given pixel column into the foreground segment, the hair segment, and the background segment of the given pixel column comprises:
identifying an average foreground-pixel color, an average hair-pixel color, and an average background-pixel color for the given pixel column; and
identifying the foreground segment, the hair segment, and the background segment of the given pixel column using a clustering algorithm to cluster the pixels in the given pixel column around the identified average foreground-pixel color, the identified average hair-pixel color, and the identified average background-pixel color for the given pixel column, respectively.

17. The method of claim 16, wherein:
identifying the average foreground-pixel color for the given pixel column comprises identifying the average foreground-pixel color for the given pixel column based on a first set of pixels at an innermost end of the given pixel column;
identifying the average hair-pixel color for the given pixel column comprises identifying the average hair-pixel color for the given pixel column based on a second set of pixels that includes a point where the given pixel column crosses the identified head contour; and
identifying the average background-pixel color for the given pixel column comprises identifying the average background-pixel color for the given pixel column based on a third set of pixels at an outermost end of the given pixel column.

18. The method of claim 1, further comprising, for each pixel column in the plurality of pixel columns:
assigning the pixels in the foreground and background segments an equal probability of being in the foreground and being in the background in the hair-identification-module persona probability map.

19. The method of claim 1, wherein assigning the pixels in the hair segment an increased foreground-probability value in the hair-identification-module persona probability map comprises:
assigning a first value to the pixels in the hair segment in the hair-identification-module persona probability map; and
assigning a second value to the pixels in the foreground and background segments in the hair-identification-module persona probability map, wherein the first value corresponds to a higher probability of being a foreground pixel than does the second value.

\* \* \* \* \*